United States Patent
Geukens

(10) Patent No.: US 8,130,609 B1
(45) Date of Patent: Mar. 6, 2012

(54) SYSTEM AND METHOD OF BIAS CONTROL

(75) Inventor: Tom Geukens, Boulder, CO (US)

(73) Assignee: Marvell International Ltd., Hamilton (BM)

( * ) Notice: Subject to any disclaimer, the term of this patent is extended or adjusted under 35 U.S.C. 154(b) by 438 days.

(21) Appl. No.: 12/123,222

(22) Filed: May 19, 2008

Related U.S. Application Data

(60) Provisional application No. 60/939,471, filed on May 22, 2007.

(51) Int. Cl.
*G11B 5/00* (2006.01)
*G11B 7/12* (2006.01)
*G11B 7/00* (2006.01)

(52) U.S. Cl. .................... 369/47.5; 369/47.51; 369/116

(58) Field of Classification Search ............... 369/47.54, 369/47.5, 116
See application file for complete search history.

(56) References Cited

U.S. PATENT DOCUMENTS 5,872,763 A * 2/1999 Osakabe .................... 369/47.53
2007/0274191 A1* 11/2007 Tanoue et al. ............... 369/116

FOREIGN PATENT DOCUMENTS

WO    WO 2005098836 A1 * 10/2005

* cited by examiner

*Primary Examiner* — Joseph Haley
*Assistant Examiner* — Nicholas Lee

(57) ABSTRACT

A system and method of laser bias control in optical recording media applications are disclosed. In some implementations, bias control for output power may be based upon a detected ratio of erase power to write (or peak) power, i.e., the $P_e/P_w$ (or Epsilon, $\epsilon$) ratio.

19 Claims, 3 Drawing Sheets

SYSTEM AND METHOD OF BIAS CONTROL

CROSS-REFERENCE TO RELATED APPLICATIONS

The present application claims the benefit of U.S. provisional application Ser. No. 60/939,471, filed May 22, 2007, entitled "Bias Control for RW Media Based on Pe/Pw (Epsilon) Ratio," the disclosure of which is incorporated herein by reference in its entirety.

BACKGROUND

1. Field of the Invention

Aspects of the present invention relate generally to writing data to, and reading data from, recording media, and more particularly to a system and method of laser bias level control.

2. Description of Related Art

Recently, rewritable (RW) optical recording media have gained popularity. Compact disc (CD), digital versatile disc (DVD), high density DVD (HD DVD), and blu-ray disc technologies have been evolving to allow multiple write operations in accordance with several standards. For example, both −RW and +RW technologies enable a disc drive head to write data to a disc multiple times without first erasing the entire disc.

In accordance with these and other optical data recording technologies, a disc drive head generally comprises a laser or other optical source and an optical pickup unit to detect lased or other collimated light reflected off the disc during read operations. As is generally known with respect to RW media applications employing such a laser, it may be desirable in many instances to control the bias level of the laser very accurately, though this has heretofore not be practically possible given current technologies. Even a small deviation in bias level may result in a slightly inaccurate ratio of erase power to write power, i.e., the $P_e/P_w$ ratio (or Epsilon, $\epsilon$, ratio), which can have deleterious effects on the efficiency with which data are written, the usable life of the recording media, or both.

In many instances (such as, for example, during +RW write operations), there is no way of sampling the bias level accurately, so indirect methods of estimating the bias level must be used. Some approaches do not even attempt to control the bias level, but rather rely upon an inefficient technique of regularly or periodically interrupting a write process and resetting the bias level to a desired or appropriate value during a read process before resuming the write. Such systems sacrifice transfer speed (i.e., data throughput rate) because they include no accommodation for managing bias level; in order to achieve optimal transfer speeds, it is generally desirable to avoid interrupting the write process, and accordingly, it may be beneficial to control the bias level continuously.

Therefore, it may be desirable in some instances to provide a system and method that can accurately control the bias level of a laser in optical recording media applications using reliable and readily available data.

SUMMARY

Embodiments of the present invention overcome the above-mentioned and various other shortcomings of conventional technology, providing a system and method of laser bias level control in optical recording media applications. In some implementations, bias control for output power may be based upon a detected ratio of erase power to write (or peak) power, i.e., the $P_e/P_w$ (or Epsilon, $\epsilon$) ratio.

The foregoing and other aspects of various embodiments of the present invention will be apparent through examination of the following detailed description thereof in conjunction with the accompanying drawing figures.

BRIEF DESCRIPTION OF THE DRAWING FIGURES

DETAILED DESCRIPTION

It is generally recognized that when the bias power ($P_{bias}$) of a laser is incorrect or at an undesirable level, the ratios of $P_{bias}$ with respect to erase power ($P_e$) and write power ($P_w$), respectively, will differ. For example, when $P_e$ is being controlled at a fixed level, e.g., by a servo loop or other appropriate mechanism, and $P_{bias}$ changes, the $P_w$ level will also change, resulting in a distorted $P_e/P_w$ ($\epsilon$) level. By monitoring output power levels during both erase and write operations, it may be possible to detect a drift in bias level by determining a change in $\epsilon$. Accordingly, it may be possible to control the bias level, for example, as a function of this $P_e/P_w$ ratio; if $\epsilon$ remains constant, the bias level is not drifting.

Figure 1:
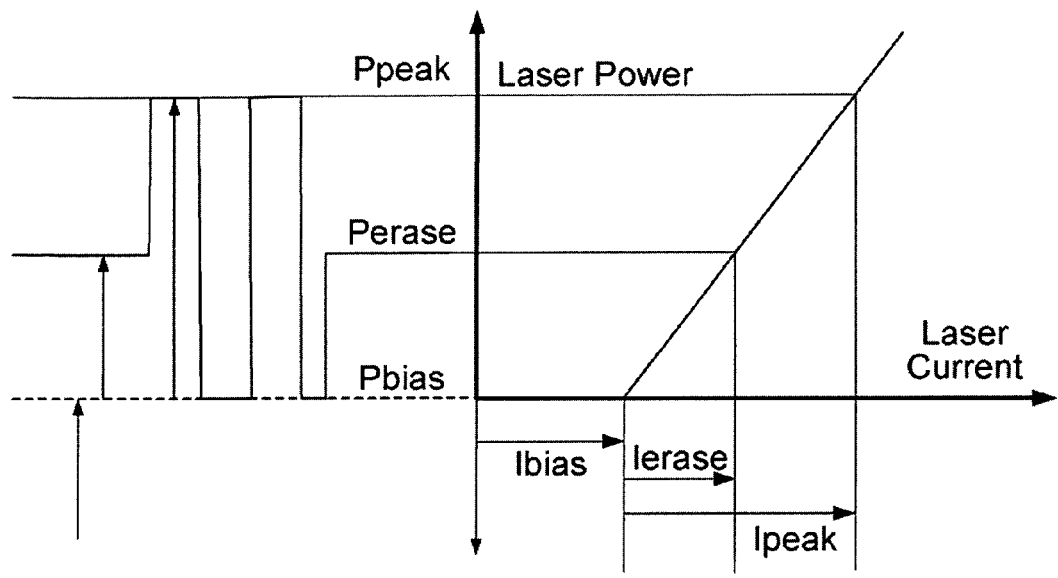
FIG. 1 is a simplified graph plotting laser power versus laser current and illustrating an appropriate value for bias current.

Turning now to the drawings, FIG. 1 is a simplified graph plotting laser power versus laser current and illustrating an appropriate value for bias current. It will be appreciated that laser output power varies linearly with input current beyond a particular threshold, i.e., the bias level. As indicated in FIG. 1, when the input current reaches this threshold value, $I_{bias}$, the laser begins to provide output at $P_{bias}$; this is typically the power level at which the laser is driven during read operations in a disc drive. Beyond the bias level, for all values of input current greater than $I_{bias}$, $P_{bias}$ will generally vary linearly (within an operational range) with input current. Typical values for $I_{bias}$ and $P_{bias}$, respectively, are about 250 mA and from about 0.01 mW to about 0.3 mW for lasers currently in use in optical recording media applications, though the present disclosure is not intended to be limited by the operational specifications of any particular laser implementation.

FIG. 1 represents an ideal situation in which $I_{bias}$ and $P_{bias}$ are at desired levels and the current for write operations, $I_{peak}$ (i.e., to drive the laser at $P_w$, or at $P_{peak}$ in FIG. 1), is maintained at exactly twice the value of the current for erase operations, $I_{erase}$ (i.e., to drive the laser at $P_e$, or at $P_{erase}$ in FIG. 1). It will be appreciated that because $I_{bias}$ and $P_{bias}$ are correct, $P_w$ ($P_{peak}$ in FIG. 1) is exactly twice the value of $P_{erase}$, as it should be given the constraint that $I_{peak}$ is generally defined to be twice the value of $I_{erase}$. In many cases, it is desirable to maintain this ratio ($\epsilon=P_e/P_w=0.5$) because of the physical properties of the recording media employed in most RW applications. While other factors may affect the selection of the erase power and the write power, current technologies generally base the power levels, at least to some degree, on one or more physical properties of the recording media. For example, the erase power level is generally selected as that which is necessary to heat the disc material to a temperature above its crystallization point (e.g., typically about 400 degrees Celsius in many applications), after which the material is allowed to cool relatively slowly. This process creates a highly reflective polycrystalline structure. On the other hand, the write operations may generally comprise applying a rapidly pulsed peak power level which raises the material of the disc to a temperature above the material's melting point. Rapid pulsing quenches the material and allows it to cool relatively rapidly. This process creates an amorphous, or less reflective, portion of the crystalline structure on the disc.

Figure 2:
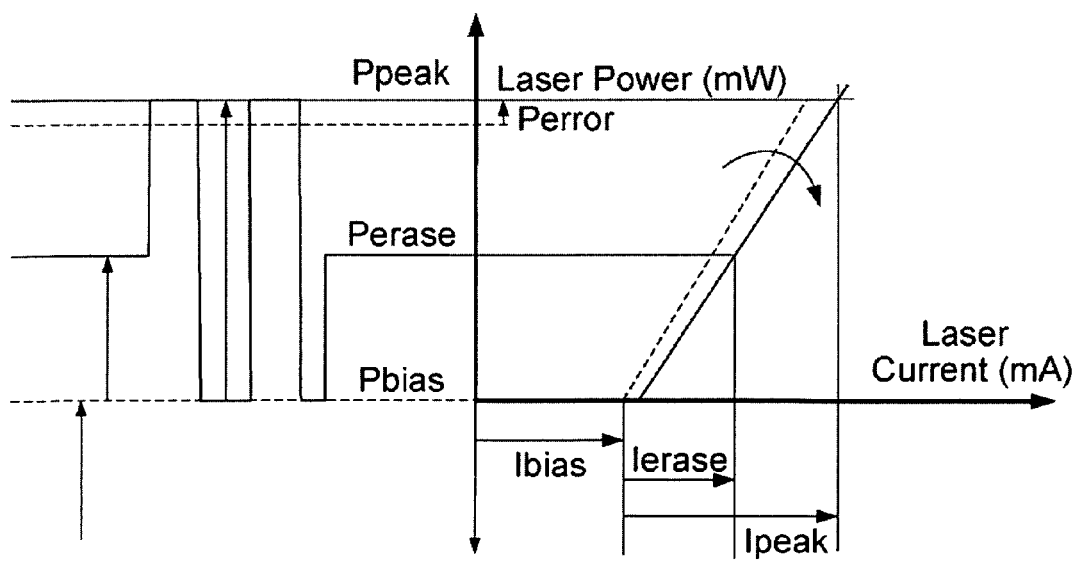
FIG. 2 is a simplified graph plotting laser power versus laser current and illustrating a situation in which a bias current is too low.
Figure 3:
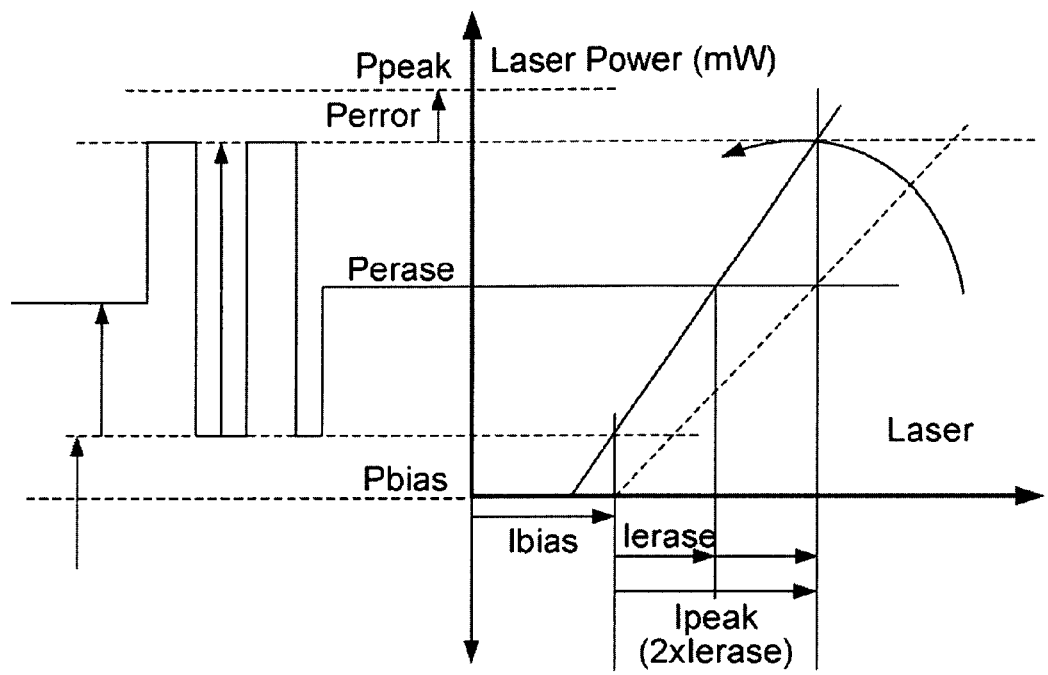
FIG. 3 is a simplified graph plotting laser power versus laser current and illustrating a situation in which a bias current is too high.

Most conventional systems define $I_{bias}$ based upon the characteristics of the laser employed. However, fixing the bias current at an expected level can create deviations in output power at the peak, or write, level as set forth below. In that regard, FIGS. 2 and 3 are simplified graphs plotting laser power versus laser current and illustrating, respectively, situations in which a bias current is too low and too high. In both instances, as in the situation illustrated in FIG. 1, $I_{peak}$ is maintained at exactly twice the value of $I_{erase}$, which is intended to create a situation in which the write power is twice the erase power. Where the set value for $I_{bias}$ does not correspond to the input required for the laser to begin providing output, the relationship between $P_w$ and $P_e$ tends to become distorted. For example, in FIG. 2 where the input bias current is too low (i.e., where the laser does not begin to provide output until the input current is greater than the expected $I_{bias}$), $P_w$ is greater than twice the value of $P_e$ by an error, $P_{error}$. On the other hand, in FIG. 3 where the input bias current is too high (i.e., where the laser begins providing output at an input current that is less than the expected $I_{bias}$), $P_w$ is less than twice the value of $P_e$ by an error, $P_{error}$. As set forth in more detail below with reference to FIG. 4, one factor that may contribute to the suboptimal situations illustrated in FIGS. 2 and 3 is temperature.

In accordance with one embodiment of a system and method of bias control, a first automatic power control (APC) loop may be implemented to control erase processes (i.e., dynamically to adjust $I_{erase}$, for instance, to maintain $P_e$ at a preselected or desired target point) while a second APC loop may be implemented to control read processes (i.e., dynamically to adjust $I_{bias}$ so as to maintain a constant $P_e/P_w$ ratio). In the foregoing manner, a peak power level, $P_{peak}$ (i.e., $P_w$) may be maintained at a different predetermined target point that has a constant relationship with respect to the desired value of $P_e$.

$P_e$ and $P_w$ may be measured, for example, using a forward sense (FS) monitoring diode (or a "front monitor diode") which is present in each optical pickup unit utilized in conventional disc drive heads. As is generally known, the output of such an FS monitoring diode is proportional to laser output power, so $P_e$ and $P_w$ may be ascertained by monitoring output of such a diode. The APC loops may be employed to maintain this FS output at the correct level and ratio. In that regard, the first APC loop may control $FS_{Erase}$ by modifying $I_{erase}$ (as noted above, it may generally be desirable to maintain $I_{peak}=2\times I_{erase}$ in many implementations), while the second APC loop may control $FS_{Erase}/FS_{Peak}$ by modifying $I_{bias}$. Maintaining this ratio as constant may ensure a correct level of $P_w$ because $I_{bias}$ (and therefore $P_{bias}$) may be finely adjusted given the constraint that $\epsilon$ should remain constant.

In the foregoing manner, a stable two loop power control approach may allow accurate control of $P_{bias}$ using the $P_e/P_w$ ratio.

Figure 4:
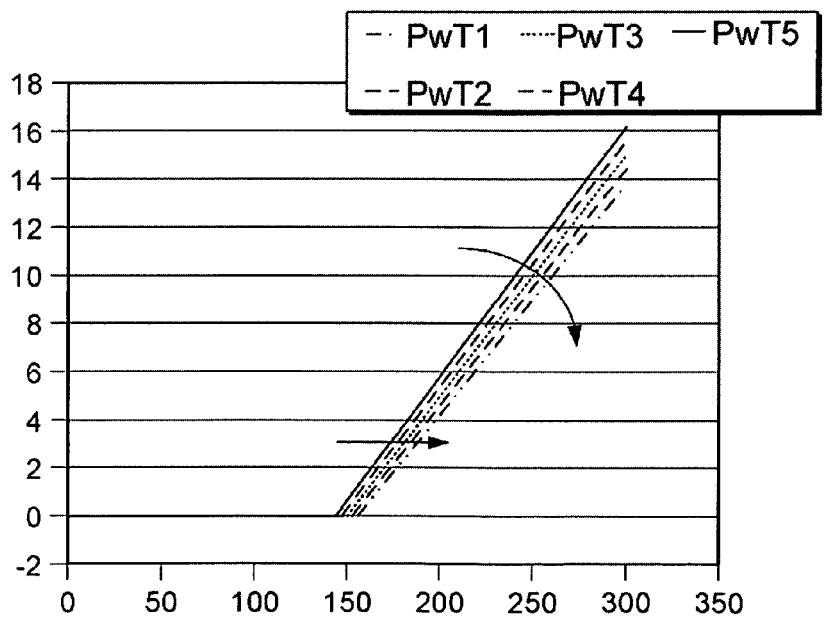
FIG. 4 is a simplified graph plotting laser power versus laser current and illustrating a decrease in efficiency with increasing temperature.

FIG. 4 is a simplified graph plotting laser power versus laser current and illustrating a decrease in efficiency with increasing temperature. As illustrated in FIG. 4, temperature may affect laser operations in two ways. First, output efficiency is generally adversely affected by increasing temperature, as indicated by the decreasing slopes for the plots of output power versus input current depicted in FIG. 4. Second, the bias current (i.e., the threshold above which the laser begins providing output) increases, as indicated by the shift of the plots to the right in FIG. 4. With respect to the data illustrated in the FIG. 4 example, at a relatively low temperature, the bias current necessary to operate the laser is around 145 mA, whereas the bias current necessary to operate the same laser at a greater temperature is around 155 mA. This operational characteristic of practical laser applications can create the discrepancies illustrated in FIGS. 2 and 3.

It will be appreciated that with a constant $I_{bias}$, the $P_e/P_w$ ratio will deviate with varying temperatures. This may be attributable to the fact that the laser may produce output at currents either slightly below or slightly above the expected $I_{bias}$ depending upon temperature, for example, or a combination of temperature and other factors. The foregoing strategy of employing an APC loop to maintain $P_e$ at a desired target point and maintaining a $I_{erase}/I_{peak}$ ratio of 0.5 enables $I_{bias}$ (and thus $P_{bias}$) to be controlled accurately using the measured value of $P_e/P_w$ ($\epsilon$). If $\epsilon$ goes low, then this may be an indication that $I_{bias}$ is too low; on the other hand, if $\epsilon$ is higher than the 0.5 target, then this may be an indication that $I_{bias}$ is too high. The bias current may be adjusted accordingly.

In that regard, it is noted that errors in $I_{bias}$ are directly and predictably proportional to errors in $\epsilon$, and accordingly, a simple phase locked loop or other feedback loop may be readily employed to adjust $I_{bias}$ as a function of deviations in $\epsilon$.

Figure 5:
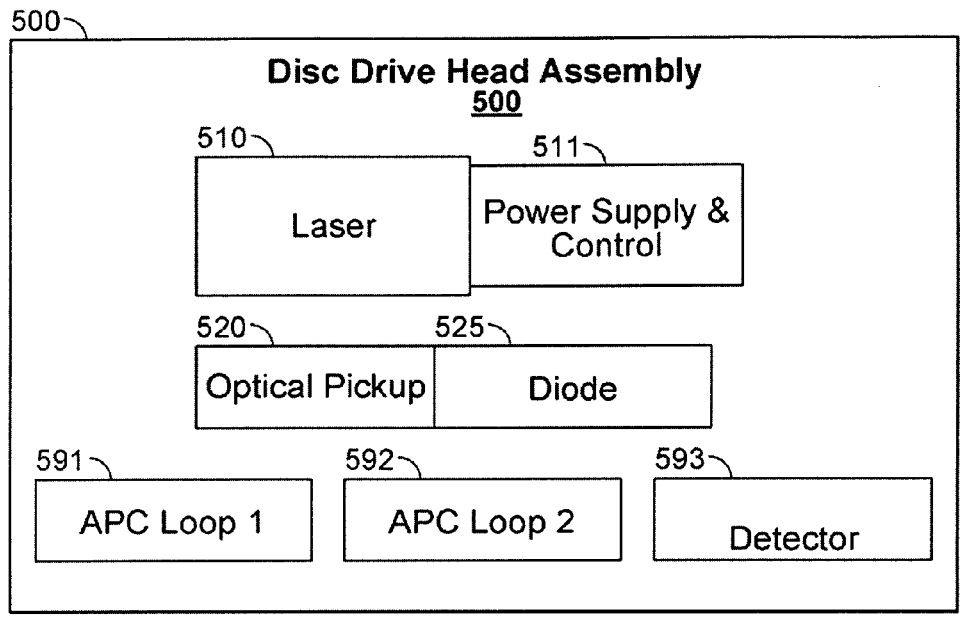
FIG. 5 is a simplified high level functional block diagram of a disc drive head assembly for use in rewritable media applications.

FIG. 5 is a simplified high level functional block diagram of a disc drive head assembly for use in rewritable media applications. A disc drive head assembly 500 may generally comprise a source of electromagnetic energy operative to output energy at a desired wavelength or wavelength range; in the FIG. 5 example, this source is indicated at the block labeled laser 510. Laser 510 may be electrically coupled to a controllable power supply and control circuit 511; as set forth above, power supply and control circuit 511 may control or otherwise regulate the current supplied to laser 510 within an operating range (e.g., between the bias current and the write or peak current) sufficient to drive laser 510 between $P_{bias}$ and $P_w$. Optical pickup unit 520 is generally operable to detect energy from laser 510 that is reflected off an optical storage medium such as a CD, a DVD, or a blu-ray disc, for instance; optical pickup 520 may be embodied in or comprise any of various types of optical sensors, photodetectors, or photoconductive cells that are generally known or developed and operative in accordance with known principles. As noted above, optical pickup 520 may generally comprise a diode 525 such as an FS monitoring diode or front monitor diode.

It will be appreciated that embodiments of assembly 500 are susceptible of numerous variations and alterations, and that assembly 500 may include several elements not specifically illustrated in FIG. 5. The present disclosure is not intended to be limited to any particular architectural arrangement or combination of elements or structures in assembly 500.

As noted above, output of diode 525 is generally proportional to laser output power; accordingly, diode 525 may be electrically coupled to Epsilon ratio detector 593. By monitoring output of diode 525, detector 593 may ascertain values for $P_e$ and $P_w$, and may compute instantaneous values of $\epsilon$. As set forth above, the bias current may be dynamically adjusted as a function of deviations in $\epsilon$ from an ideal value, e.g., 0.5.

As set forth above, a first APC loop 591 may be designed and operative to control $I_{erase}$ to maintain $P_e$ at a preselected or desired target point. In that regard, loop 591 may employ feedback on real values of $P_e$ from detector 593, diode 525, or both to adjust $I_{erase}$ as desired to create a proper current input to drive laser 510 for erase operations. In that regard, output from loop 591 may be coupled with or otherwise communicated to power supply and control circuit 511, which may then drive laser 510. It will be appreciated that loop 591 may employ additional factors in some instances. For example, where assembly 500 includes temperature transducers or other suitable measurement equipment, loop 591 may employ real or estimated values for the efficiency of laser 510 (e.g., at a given temperature) in computing a value for $I_{erase}$.

A second APC loop 592 may be designed and operative to control $I_{bias}$ in a manner sufficient to minimize the deviation in $\epsilon$ from the desired value or otherwise to maintain a constant $P_e/P_w$ ratio. In that regard, loop 592 may receive output from detector 593, diode 525, or both, and use deviations in $\epsilon$ from a desired value to adjust $I_{bias}$ such that $\epsilon$ moves closer to the idea value, i.e., minimizing the deviation. As set forth above, it may be desirable to make $\epsilon$=0.5, which ensures that write power is exactly twice that of erase power; this ratio works well for many RW media. Output from loop 592 may be provided to power supply and control circuit 511, which may then drive laser 510 for read operations at a dynamically adjusted $I_{bias}$ computed to preserve a proper $P_e/P_w$ ratio. As with loop 591, the second loop 592 may employ additional factors (such as temperature) or feedback to compute $I_{bias}$ depending, for example, upon overall processing capabilities and hardware elements of assembly 500.

In some embodiments, loops 591 and 592 and detector 593 may be integrated into a single application specific integrated circuit (ASIC) or other hardware element; alternatively, one or more of components 591-593 may be implemented independently, e.g., on a separate IC.

Figure 6:
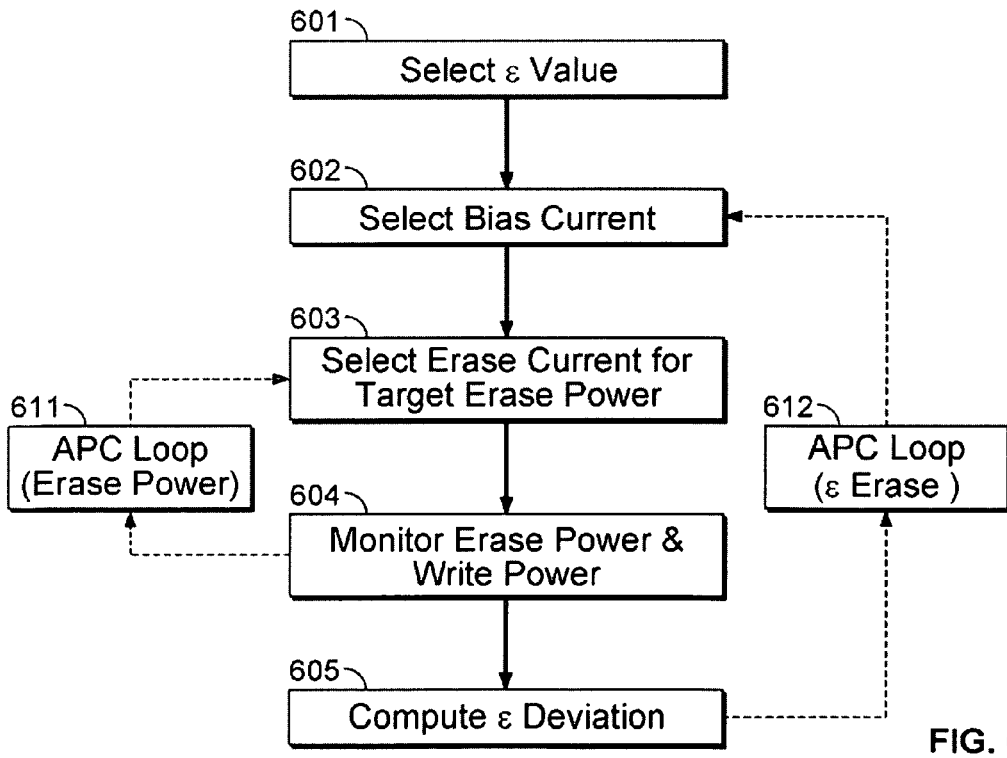
FIG. 6 is a simplified flow diagram illustrating operation of one embodiment of a method of controlling bias level.

FIG. 6 is a simplified flow diagram illustrating operation of one embodiment of a method of controlling bias level. It is noted that the method illustrated in FIG. 6 may be executed or facilitated by various functional components depicted in FIG. 5, or by other suitably configured architectures.

As indicated at block 601, a method of laser bias level control may begin with selecting a target value for $\epsilon=P_e/P_w$. As noted above, for many RW media applications, it is desirable that $\epsilon$=0.5. In the operations that follow, it is assumed that the selected value for $\epsilon$ is a constraint that influences the remainder of the processing. A bias current may be selected or computed as indicated at block 602. Initially, the bias current may be assumed from the operational characteristics of the laser employed, for instance. However, as noted above, various factors including temperature may affect the input current at which a laser begins producing output. Accordingly, the selection or computation depicted at block 602 may be influenced by a feedback loop as set forth above.

An erase current may be selected or computed such that a target erase power may be maintained as indicated at block 603. It is noted that for many lasers, output power may vary as a function of input current and may be affected by, among other factors, temperature; accordingly, the operation depicted at block 603 may take into consideration various operational characteristics of the laser employed, such as efficiency and performance degradation due to temperature or other operational conditions. In some implementations, an erase current selected at block 603 is operative to drive the laser at the lowest power required to melt a desired or appropriate amount of disc material in a given time, as is generally known in the art—this power may vary, for example, depending upon whether the optical recording medium is a CD, a DVD, or a blu-ray disc, for instance, or as a function of the instantaneous rotational velocity of the disc or other factors.

Write (or peak) power and erase power may be monitored as indicated at block 604. In the FIG. 5 embodiment, the monitoring at block 604 may be effectuated or facilitated by a diode 525 at an optical pickup unit 520 which detects electromagnetic energy reflected off of the disc; output of such a diode is generally proportional to output power of the laser. Detected values for $P_e$ may be employed in a feedback loop to control $I_{erase}$ as indicated at block 611 and the loop back to block 603.

Given detected values for $P_e$ and $P_w$, errors in the ratio of these power levels may be compared with the value of $\epsilon$ selected at block 601. The method may employ measured data to compute deviations from the ideal $\epsilon$ (block 605) and further may employ such errors in a feedback loop to control the bias current as indicated at block 612 and the loop back to block 602. As set forth above, given the erase current, a fixed relationship between the erase current and the write current, and a target value for $\epsilon$, one factor of which (i.e., $P_e$) is being tightly controlled by an APC loop, bias current adjustments may readily be made to account for errors in $\epsilon$ such that the relationship between write power and erase power may be maintained in a desired manner.

In accordance with the foregoing, a method of controlling the bias level of a laser may be implemented in hardware, firmware, software or other instruction sets maintained in a computer readable medium, or a combination of these. A system and method of laser bias level control as described herein may be integrated with or employed in conjunction with any device with optical read/write capabilities such as, for instance, a blu-ray, DVD, or CD drive or player, a personal or laptop computer, a set top box or digital video recorder (DVR), or any other device making use of rewritable optical recording applications.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of controlling a laser in a rewritable recording medium application, the method comprising:
   selecting a target value of a ratio between a target erase power level and a target write power level;
   selecting a bias current;
   in a first automatic power control loop, monitoring an erase power level when data is being erased from a rewritable recording medium and dynamically adjusting an erase current based on the monitored erase power level to maintain the target erase power level;
   monitoring a write power level when data is being written to the rewritable recording medium; and
   in a second automatic power control loop, computing a deviation from the target value of the ratio based on the monitored erase power level and the monitored write power level and adjusting the bias current in response to the computing.

2. The method of claim 1, wherein the adjusting comprises setting the bias current to minimize the deviation from the target value of the ratio.

3. The method of claim 1, wherein the adjusting comprises setting the bias current to preserve the target value of the ratio.

4. The method of claim 1, wherein the target value of the ratio is defined according to a physical property of the rewritable recording medium.

5. The method of claim 1, wherein the monitoring the erase power level and the monitoring the write power level comprises utilizing an optical pickup unit to detect output from the laser.

6. The method of claim 1, wherein the monitoring the erase power level comprises monitoring the erase power level using a forward sense monitoring diode, and wherein the monitoring the write power level comprises monitoring the write power level using the forward sense monitoring diode.

7. A disc drive head assembly for use with a rewritable recording medium, the assembly comprising:
  a laser;
  a power management circuit to select a bias current for the laser and to control an input current to the laser;
  an optical pickup unit to monitor an erase power level when data is being erased from the rewritable recording medium, and to monitor a write power level when data is being written to the rewritable recording medium;
  an Epsilon ratio detector to receive output from the optical pickup unit and to compute a deviation from a target value of a ratio between a target erase power level and a target write power level;
  a first automatic power control loop to output a value of the monitored erase power level to the power management circuit to cause the power management circuit to adjust an erase current based on the monitored erase power level to maintain the target erase power level; and
  a second automatic power control loop to output a value of the deviation to the power management circuit to cause the power management circuit to adjust the bias current to minimize the deviation.

8. The assembly of claim 7, wherein the power management circuit is further configured to adjust the bias current to preserve the target value of the ratio.

9. The assembly of claim 7, wherein the target value of the ratio is defined according to a physical property of the rewritable recording medium.

10. The assembly of claim 7, wherein the target value of the ratio is 0.5.

11. The assembly of claim 7, wherein the optical pickup unit comprises a forward sense monitoring diode to monitor the erase power level and to monitor the write power level by detecting output of the laser reflected off of the rewritable recording medium.

12. A non-transitory computer readable medium having computer-executable instructions stored thereon that, when executed, cause a disc drive head assembly, for use with a rewritable recording medium, to perform a method comprising:
  selecting a target value of a ratio between a target erase power level and a target write power level for a laser;
  selecting a bias current for the laser;
  in a first automatic power control loop, monitoring an erase power level when data is being erased from the rewritable recording medium and dynamically adjusting an erase current based on the monitored erase power level to maintain the target erase power level;
  monitoring a write power level when data is being written to the rewritable recording medium; and
  in a second automatic power control loop, computing a deviation from the target value of the ratio based on the monitored erase power level and the monitored write power level and adjusting the bias current in response to the computing.

13. The computer readable medium of claim 12, wherein the adjusting comprises setting the bias current to minimize the deviation from the target value of the ratio.

14. The computer readable medium of claim 12, wherein the adjusting comprises setting the bias current to preserve the target value of the ratio.

15. An integrated circuit for controlling a bias level of a laser in a rewritable recording medium application, the integrated circuit comprising:
  a power control circuit to select a bias current for the laser and to control an input current to drive the laser at a target erase power level to erase data from a rewritable recording medium and to drive the laser at a target write power level to write data to the rewritable recording medium;
  a detector to compute a deviation from a target value of a ratio between a monitored erase power level and a monitored write power level;
  a first automatic power control loop to output a value of the deviation to the power control circuit, the power control circuit further configured to receive the value of the deviation and to adjust the bias current to minimize the deviation; and
  a second automatic power control loop to output the monitored erase power level to the power control circuit to cause the power control circuit to adjust an erase current based on the monitored erase power level to maintain the target erase power level.

16. The integrated circuit of claim 15, wherein the power control circuit is further configured to adjust the bias current to preserve the target value of the ratio.

17. The integrated circuit of claim 15, wherein the target value of the ratio is defined according to a physical property of the rewritable recording medium.

18. The integrated circuit of claim 15, wherein the target value of the ratio is 0.5.

19. The integrated circuit of claim 15, wherein the detector receives the monitored erase power level and the monitored write power level from a forward sense monitoring diode, the forward sense monitoring diode configured to monitor the monitored erase power level and to monitor the monitored write power level by detecting output of the laser reflected off of the rewritable recording medium.

* * * * *